United States Patent [19]

Lebeck

[11] Patent Number: 4,834,400
[45] Date of Patent: May 30, 1989

[54] DIFFERENTIAL SURFACE ROUGHNESS DYNAMIC SEALS AND BEARINGS

[75] Inventor: Alan O. Lebeck, Albuquerque, N. Mex.

[73] Assignee: University of New Mexico, Albuquerque, N. Mex.

[21] Appl. No.: 168,519

[22] Filed: Mar. 15, 1988

[51] Int. Cl.$^4$ .......................... F16J 9/26; F16J 15/16
[52] U.S. Cl. .................................. 277/236; 277/237 R;
    277/96.1; 277/DIG. 6; 384/625; 29/149.5 R
[58] Field of Search ................... 277/1, 96, 96.1, 236,
    277/237, DIG. 6; 384/95, 625; 29/149.5 R

[56] References Cited

U.S. PATENT DOCUMENTS

| | | | |
|---|---|---|---|
| 1,637,317 | 7/1927 | Shoemaker . | |
| 1,902,621 | 3/1933 | Davis et al. | 29/149.5 R |
| 2,268,869 | 1/1942 | Given | 308/239 |
| 2,577,818 | 12/1951 | Shaw | 29/149.5 R |
| 2,971,248 | 2/1961 | Kingsley et al. | 29/149.5 |
| 3,075,816 | 1/1963 | Harris et al. | 308/135 |
| 3,235,316 | 2/1966 | Whanger | 308/8.2 |
| 3,563,331 | 1/1971 | Randolph . | |
| 3,572,730 | 3/1971 | Otto | 277/96 |
| 3,586,340 | 6/1971 | Otto | 277/96 |
| 3,656,823 | 4/1972 | Tiraspolsky et al. | 308/160 |
| 3,961,104 | 6/1976 | Tanner | 427/198 |
| 4,227,703 | 10/1980 | Stalker et al. | 277/DIG. 6 XR |
| 4,474,861 | 10/1984 | Ecer | 428/614 |
| 4,562,122 | 12/1985 | Hodes et al. | 428/644 |

FOREIGN PATENT DOCUMENTS 599161  3/1948  United Kingdom ............... 384/625

OTHER PUBLICATIONS

"Triangular Asperities Control Seal Leakage and Lubrication" in *SAE Transactions* vol. 83, 1974, pp. 904–911.

*Primary Examiner*—Robert S. Ward
*Attorney, Agent, or Firm*—Deborah A. Peacock; Robert W. Weig

[57] ABSTRACT

A dynamic seal or bearing interface having areas with different roughnesses. The different surface areas both provide asperity tip load support for the opposing interface.

16 Claims, 5 Drawing Sheets

DIFFERENTIAL SURFACE ROUGHNESS DYNAMIC SEALS AND BEARINGS

FIELD OF THE INVENTION

The invention relates to dynamic seals and bearings and more particularly to dynamic seals and bearings incorporating materials which wear to provide surfaces differing in roughness. which surfaces provide asperity tip load support. If desired. the dynamic seals and bearings can further comprise materials which wear by different amounts.

BACKGROUND OF THE INVENTION

Dynamic seals are those which act to control fluid leakage between two surfaces which slide against one another. Such seals are quite common and include face seals for pumps, ship propeller shafts, compressors and appliances, lip seals for oil and grease, packings for pistons and piston rods, and piston rings for engines and compressors. Performance of existing sealing devices frequently imposes limits on the reliability, life and efficiency of machines requiring their use. Indeed, many sealed bearings fail in service due to failure of a dynamic seal therein. Process industries spend a good deal of time and money maintaining and replacing dynamic seals in their equipment.

Most dynamic seals suffer from two limitations. First, the seal typically wears out faster than the rest of the machine of which it forms a part. Second, the seal intrinsically contributes significantly to the frictional load of the machine in which it functions. These limitations occur because a dynamic seal comprises two surfaces or faces squeezed together which slide against each other during the operation of the machine of which it is a part. In many cases, lubrication of the seal during the time the faces are sliding against each other is poor at best.

Recent advances in seal and bearing technology have primarily been addressed to improved materials, such as materials having a higher hardness, materials with improved resistance to heat and corrosion and materials which use polymers. Improvements have also been made in the geometry of seals. For example, waviness and radial taper have been used in face seals and various types of grooves have been used on lip seals. U-cup, V-wedge and slipper seal designs have been used in packings.

Other seals and bearings have been developed having "peaks" and "valleys" on the sliding surfaces to enhance lubrication. Otto, in U.S. Pat. No. 3,572,730, entitled WEAR SURFACE FOR FACILITATING LUBRICATION OF ELEMENTS IN ENGAGEMENT THEREWITH and U.S. Pat. No. 3,586,340, entitled WEAR SURFACE AND SEAL CONSTRUCTION, and in *SAE Transactions*, Vol. 83, 1974, entitled "Triangular Asperities Control Seal Leakage and Lubrication," teaches the use of lithographic or photographic techniques to provide a bearing surface which has a geometric array of large size triangular asperities. The surfaces are then coated with plastic so that the voids surrounding the asperities are filled with plastic. The plastic then preferentially wears during operation exposing the triangular asperities. Otto does not teach differential roughness or providing load support across the entire surface.

Others teach the use of alternating hard and soft surface materials to provide various useful characteristics as disclosed in the following U.S. Pat. Nos.: 4,474,861, entitled COMPOSITE BEARING STRUCTURE OF ALTERNATING HARD AND SOFT METAL, AND PROCESS FOR MAKING THE SAME, to Ecer; 1,637,317, entitled BEARING, to Shoemaker; 3,235,316, entitled JOURNAL BEARING WITH ALTERNATING SURFACE AREAS OF WEAR RESISTANT AND ANTI-GALLING MATERIALS, to Whanger; 2,971,248, entitled COMPOSITE BEARINGS AND METHOD OF FORMING THE SAME, to Kingsley, et al.; 2,268,869 entitled BEARING MEMBER, to Given; 356,331, entitled ANTI FRICTION JOURNAL BEARING, to Randolph; 4,562,122, entitled MULTI-LAYER PLAIN BEARING, to Hodes, et al. (see FIG. 3 of Hodes); 3,656,823, entitled SLIDABLE CARRIER OR SUPPORT, to Tiraspolsky, et al.; 3,961,104, entitled INTERNAL CYLINDRICAL BEARING SURFACES, to Tanner; and 3,075,816, entitled BEARINGS FOR RELATIVELY ROTATING MEMBERS, to Harris, et al. None of these references disclose differential roughness, differential wear or providing load support across the entire surface.

One relatively unexplored approach to improving seal life and efficiency is to control the microgeometry or microtopography, i.e., the geometric variations in surface roughness, which establish lubricating fluid film height variations of the seal face. The present invention addresses this approach utilizing a bearing comprising a surface having regions which, as they wear, yield different amounts of surface roughness which still provides asperity tip load support. Ancillary to this, and in conjunction therewith, the wear rate of the surface regions in combination with the surface roughness may be controlled during the use and consequently during the wear of the bearing surface. Bearings and seals in accordance with the invention have enhanced load support and lubrication characteristics, and control fluid leakage by utilizing surfaces having regions of differential roughness. By utilizing differential roughness, different regions of the bearing surface develop different effective film thicknesses, thereby controlling hydrodynamic and hydrostatic pressures.

SUMMARY OF THE INVENTION

In accordance with the invention, there is provided a dynamic seal or bearing interface having a surface comprising a first interface area which, as it wears, provides a first amount of surface roughness which provides asperity tip load support; and a second interface area which, as it wears, provides a second amount of surface roughness which provides asperity tip load support. The second amount of surface roughness within the second interface area is different from the first amount of surface roughness within the first interface area. The first and second interface areas can be alternating and intersticed or alternating and contiguous.

Preferably, the interface areas are made of different materials, although these areas may be of the same material with one interface area having a different microstructure which thus develops a different roughness than the other interface area. At least one of the interface areas should be treated to a depth of at least 0.005 inches to produce a rough surface for a long-wearing seal. The interface areas may be a layer or layers affixed to a substrate or may be the same material as the substrate material.

Some specific base materials and the preferred materials or processes which may be utilized in accordance with the intention to produce a differential surface roughness in the two interface areas are set forth in Table I.

TABLE I

Preferred Materials and Processes of the Invention.

| Base Material | Material or Process |
| --- | --- |
| Gray iron | Leaching, filling, chrome plating or flame spray |
| Cast iron | Hard chrome/soft chrome |
| Carbidic malleable iron | Laser heat treat |
| Alumina | High density/low density |
| Silicon nitride | High density/low density |
| Carbon Graphite | Siliconizing, density variation, variable filler |
| Polymer | Variable filler, radiation |

One object of the invention is to improve dynamic seal and bearing life.

Another object of the invention is to improve dynamic seal and bearing reliability.

One advantage in practicing the invention is that maintenance costs and down times are reduced when using dynamic seals and bearings in accordance with the invention.

Another advantage of the invention is that dynamic seals and bearings in accordance with the invention are efficient.

Other objects, advantages and novel features, and further scope of applicability of the present invention will be set forth in part in the detailed description to follow, taken in conjunction with the accompanying drawing, and in part will become apparent to those skilled in the art upon examination of the following, or may be learned by practice of the invention. The objects and advantages of the invention may be realized and attained by means of the instrumentalities and combinations pointed out in the appended claims.

BRIEF DESCRIPTION OF THE DRAWING

The accompanying drawing, which is incorporated into and forms a part of the specification, illustrates several embodiments of the present invention and, together with the description, serves to explain the principles of the invention.

DETAILED DESCRIPTION OF THE INVENTION

This invention relates to a dynamic seal or bearing comprising regions having a different roughness, which regions all provide load support. Because the various regions all provide load support, there is no differential wear. Wear is generally measured by measuring the roughness tips or peaks. Since all regions of the seal or bearing provide load support (peaks which contact an opposing face), then there would be no differential wear between these various regions.

Figure 1:
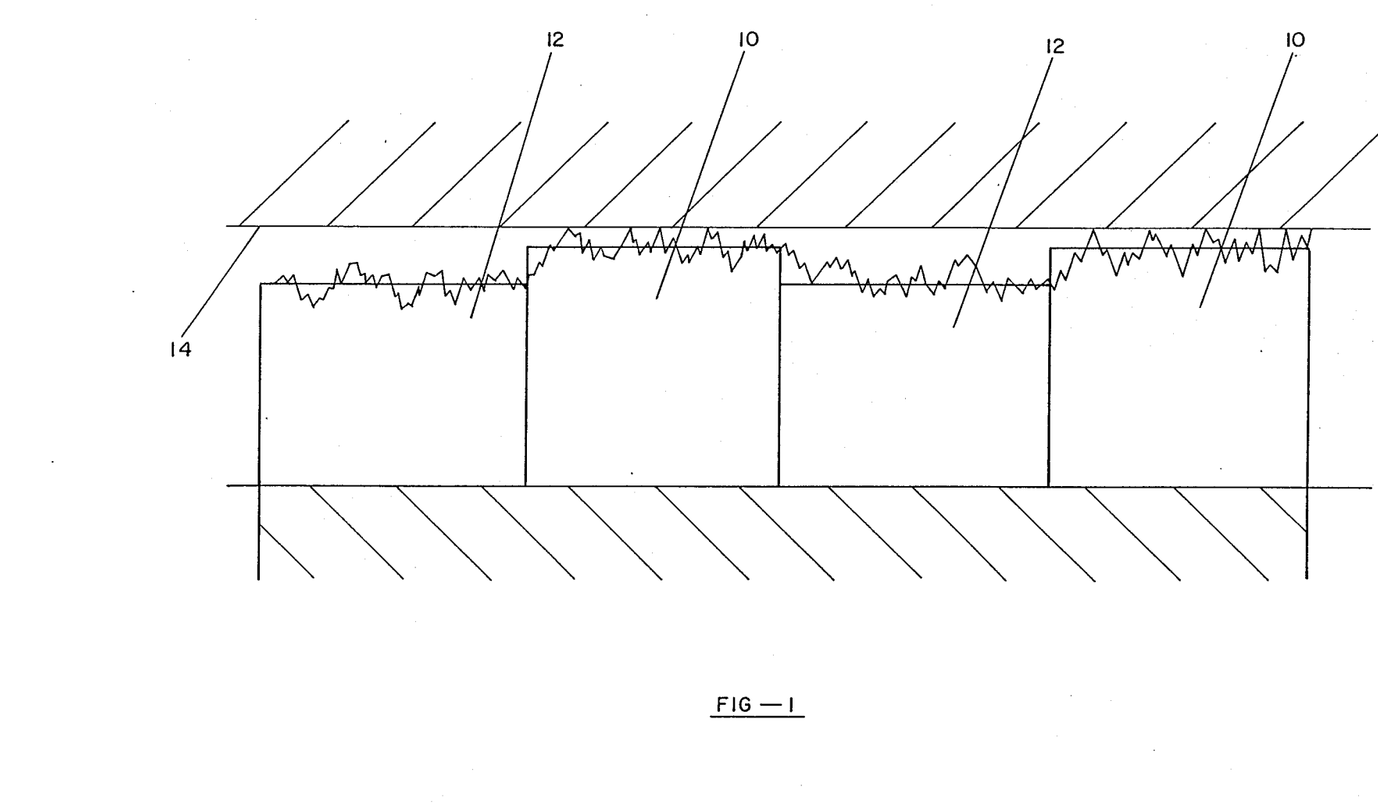
FIG. 1 illustrates a cross section of a prior art seal or bearing showing peaks and valleys, wherein the valleys do not provide load support.

FIG. 1 of the drawing shows a prior art seal cross section in which peak regions 10 and valley regions 12 occur on the surface of the seal. Note that only the peak regions 10 provide load support for the opposing surface 14; the valley regions 12 are not in contact with the opposing surface 14 and thus cannot provide load support. Because of the lack of load support from the valley regions 12, the seal will tend to distort or tilt. The microstructural roughness on the surface of the bearing regions is illustrated by the wavy or jagged lines.

Figure 2:
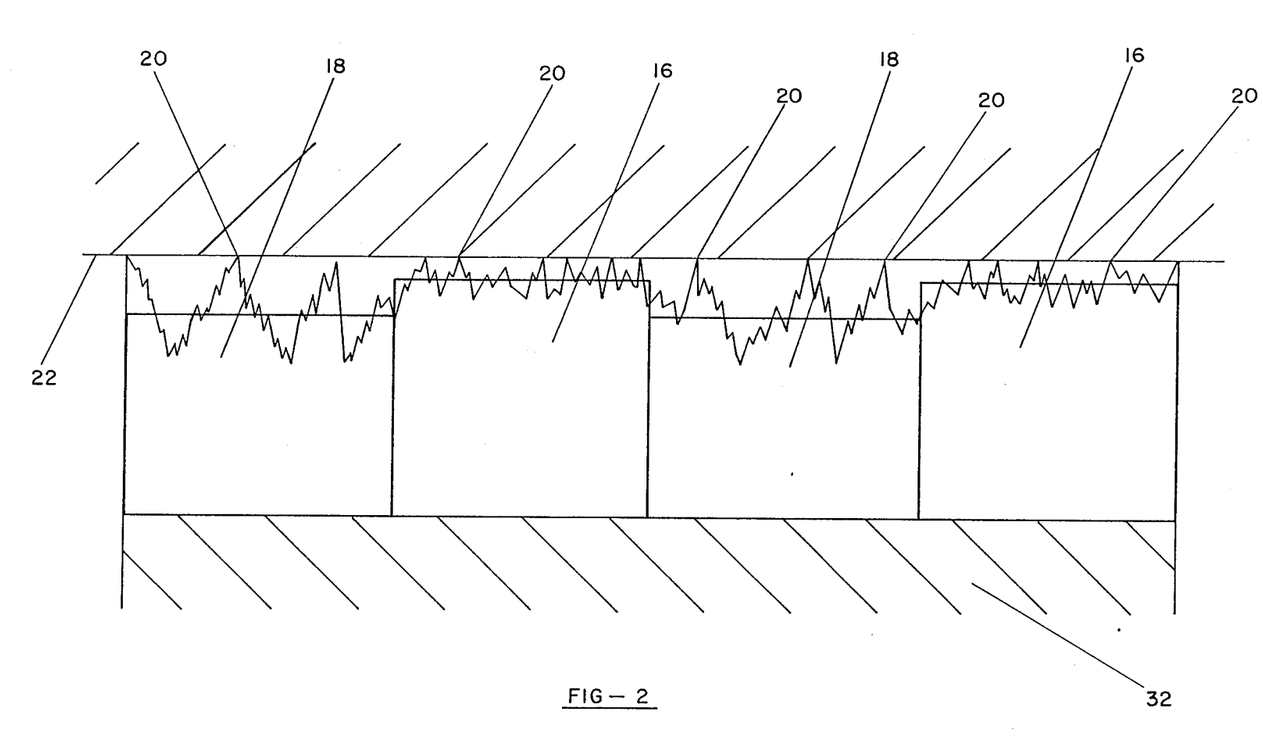
FIG. 2 illustrates a cross section of an embodiment of the invention showing differential roughness.

FIG. 2 of the drawing, in contrast to the prior art configuration of FIG. 1, shows a seal cross section in accordance with the invention comprising peak regions 16 and valley regions 18 with a differential roughness. Both the peak regions 16 and valley regions 18 have asperity tips 20 which contact with and provide load support for the opposing bearing or seal surface 22. The horizontal lines shown in FIGS. 1 and 2 are not part of the surface, but are intended to illustrate, in both FIGS. 1 and 2, the average or mean surface level. The cross section in FIG. 3 (which does not have these horizontal lines) is more representative of how the surface would appear. Note that the roughness, as illustrated by the jagged lines in the drawing. is exaggerated for purposes of illustration. The roughness of the invention would not be as visible as it is on a microstructural level.

Figure 3:
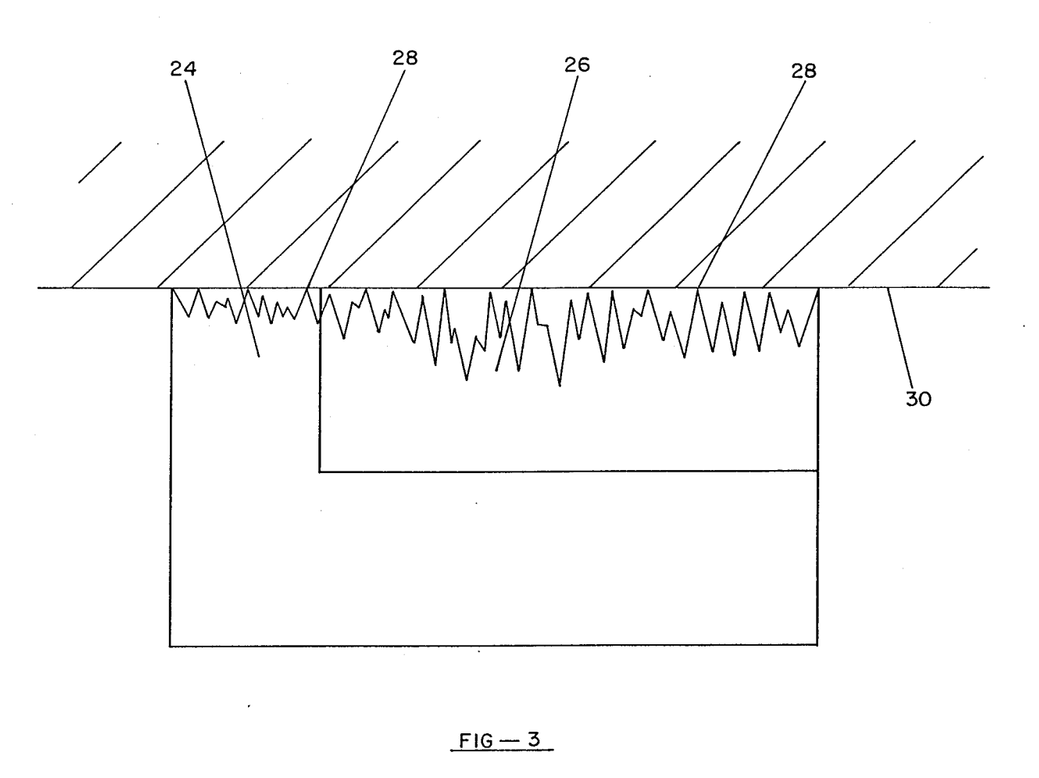
FIG. 3 illustrates a cross section of a piston ring embodiment of the invention showing differential roughness.

FIG. 3 of the invention illustrates a piston ring embodiment of the invention comprising a first region or area 24 having a first amount of roughness and a second region or area 26 having a second amount of roughness which is different than the first amount of roughness of the first area 24. Both areas 24 and 26 comprise asperity tips 28 which contact with and provide load support for an opposing surface 30.

FIG. 2 illustrates the peak regions 16 and valley regions 18 as a layer on a substrate material 32. Alternatively, the substrate material may also comprise the surface material as shown by region 24 in FIG. 3.

Figure 4:
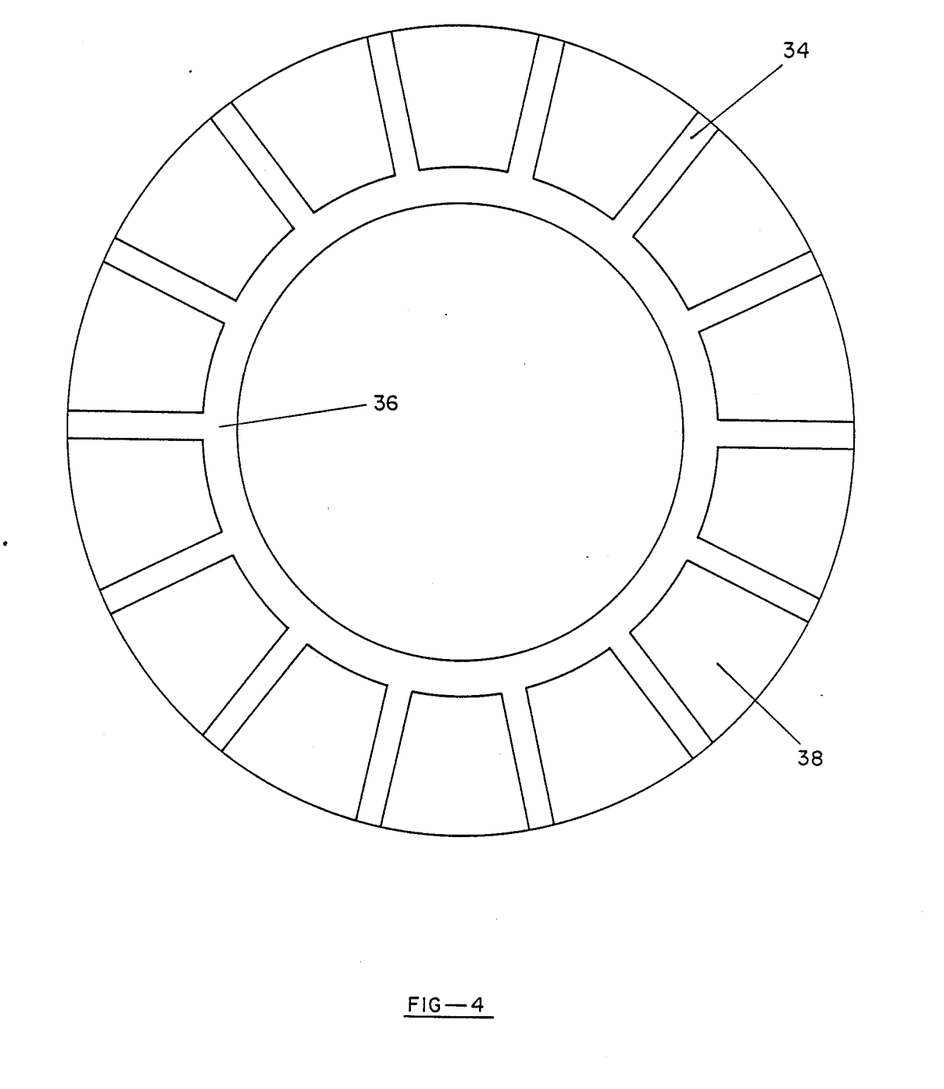
FIG. 4 illustrates a radial land-dam seal embodiment of the invention.

FIG. 4 illustrates a radial land-dam mechanical face seal embodiment of the invention wherein the "land" areas 34 and "dam" areas 36 have a roughness which is different than the other surface areas 38.

Figure 5:
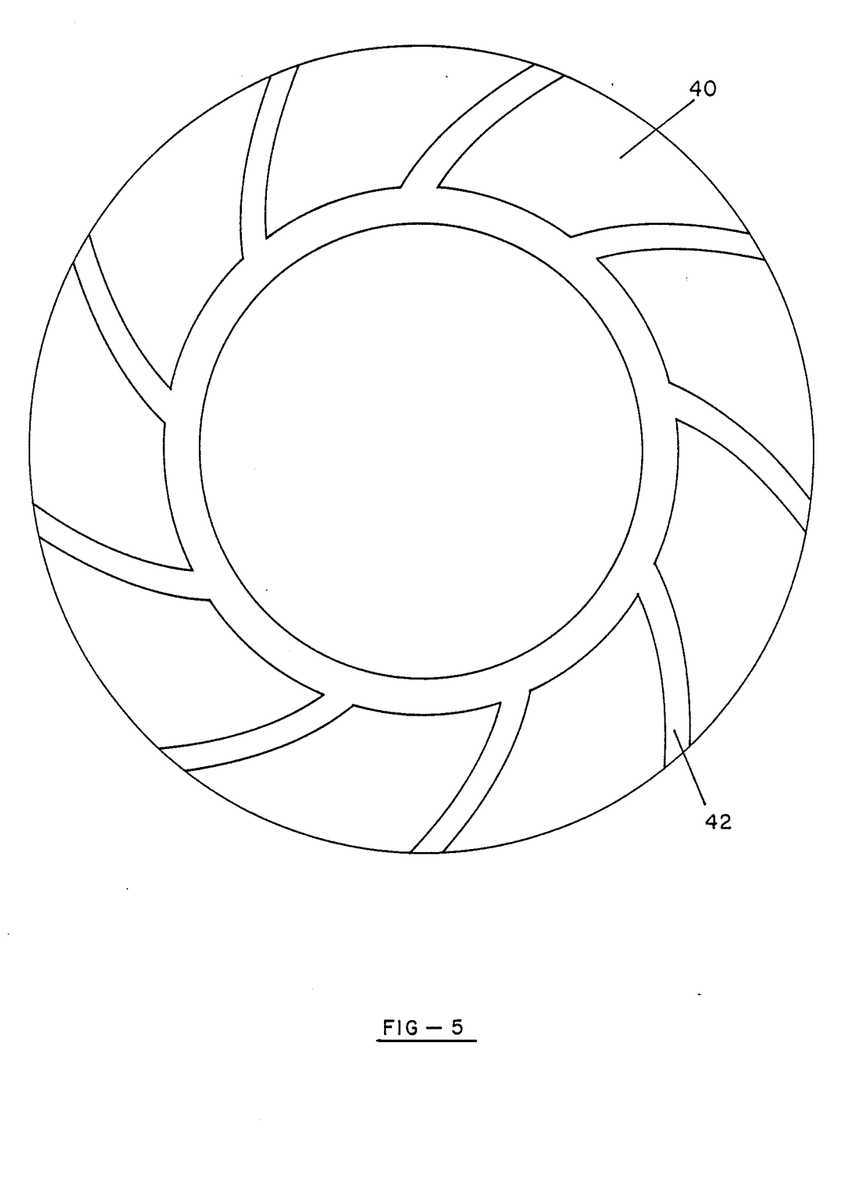
FIG. 5 illustrates a spiral-groove seal embodiment of the invention.

FIG. 5 illustrates a spiral-groove mechanical face seal embodiment of the invention wherein the "groove" areas 40 have a roughness which is different than the other surface areas 42.

As can be appreciated by those skilled in the art, the differential roughness of the invention can be applied to nearly any type of sliding, contacting, lubricated contact surface. including sliding bearings and sliding seal interfaces, to control lubrication and reduce friction. The differential roughness of the invention may be applied to mechanical face seals, reciprocating seals, lip seals, piston and rod packings, piston rings, bearings, rotating gas seals and the like. Throughout the specification and claims, the terms "seals" and "bearings" are often used interchangeably and are intended to include such interfaces mentioned above. The drawing illustrates only several of many possible cross sections of the seal or bearing of the invention. For example, seals having various geometries (such as the configurations shown in FIGS. 4 and 5) can comprise geometric regions having differential roughnesses. The differential roughness of the invention has commercial applications for mechanical seal manufacturers, aircraft turbojet engine manufacturers, auto makers, air and hydraulic cylinder manufacturers, compressor manufacturers, adiabatic engines, rotary combustion engines, rocket engines and advanced turbojet engines.

The surface area of the seal or bearing having the highest degree of roughness (the peak-to-valley height), such as the valley regions 18 shown in FIG. 2 and the second area 26 shown in FIG. 3, provides a pressure change, a greater fluid film thickness and enhanced lubrication for the seal. The asperity tips provide load support, less friction and a longer-lasting and better-wearing seal. The lubrication of seals and bearings is controlled by selecting the height of the fluid film gap. It is well known in the art that the effective fluid film gap for a lubricant is approximately equal to the distance between asperity peaks and the mean level (represented by the horizontal lines in FIG. 2) of the bearing surface. Therefore, the effective fluid film gap for a surface, in contact, is proportional to the surface roughness. This applies to two rough surfaces in contact with each other as well as to a smooth surface contacting a rough surface. Thus, lubrication can be controlled, in accordance with the invention, by using materials which evolve different roughnesses which, in turn, provide different levels of effective film thickness. The rougher material inherently has a greater average depth for fluid flow, creating in effect a differential surface height.

The surface regions of the seal of the invention having a differential roughness may be provided in various way. For example, different materials in a composite structure may be utilized. Alternatively, a material which has selectively altered regions may be utilized. The differential roughness may evolve due to the nature of the material itself, the lubrication present and/or the sliding processes.

There are many techniques or processes which may be utilized in accordance with the invention to provide an interface surface with a selective differential roughness and, if desired, differential wear. Some of these techniques include nitriding (for instance, the nitriding of stainless steel using machined patterns for masking); stellite treatment; siliconizing; surface depth heat treating, such as by a laser or torch; electron beam or irradiation (such as ultraviolet, gamma or high-energy radiation) property modification; sintering (for instance, prior to the sintering, the areas are differentially compacted or compressed); surface alloying; joining of different materials; patterned chemical treatments for polymers; patterned polymerization; impregnation (such as resin for carbons); grain size refinement; differential material fatigue; filling; laser or vapor or chemical deposition; leaching or etching; plating; flame or plasma spraying; chroming; melting; coating with PTFE (Teflon, a trademark); density variation; and the like. The use of different materials tends to provide more of a differential roughness than when the same material is utilized.

Some specific base materials and the preferred materials or processes which may be utilized to produce differential roughnesses in which base materials are set forth in Table II.

TABLE II

| Preferred Materials and Processes of the Invention. | |
|---|---|
| Base Material | Material or Process |
| Gray Iron | Leaching, filling, chrome plating or flame spray |
| Cast iron | Hard chrome/soft chrome |

TABLE II-continued

| Preferred Materials and Processes of the Invention. | |
|---|---|
| Base Material | Material or Process |
| Carbidic malleable iron | Laser heat treat |
| Alumina | High density/low density |
| Silicon nitride | High density/low density |
| Carbon Graphite | Siliconizing, density variation, variable filler |
| Polymer | Variable filler, radiation |

As can be appreciated by those skilled in the art, a differential roughness can be provided by other processes or materials and is not limited to those discussed above. Regardless of the specific process or materials used to provide a differential roughness, the roughness needs to be deep enough to retain the roughness characteristics as the surface wears. Preferably, the surface is treated by processes, such as those discussed above, to a depth of at least approximately 10 micrometers (0.005 in.).

The surface or interface areas having a differential roughness may be alternating and intersticed or alternating and contiguous.

EXAMPLE 1

A mechanical face seal was produced having a stainless steel face riding against carbon in water. Radial bands or strips were nitrided onto the steel. The face was ground flat at the start of the test. After two days of continuous operation, friction smoothed out and became markedly lower, leakage decreased and the seal ran very well for the balance of the test. The lubrication improved because of better hydrodynamic lubrication.

Accordingly, this invention relates to improved seals and bearings having a differential surface roughness. Such seals and bearings can be operated longer and more reliably in more severe environments, have a reduced maintenance cost, more in-service time, reduced friction, improved lubrication and a higher produce quality.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. A dynamic seal or bearing interface having a surface comprising:
    a first interface area which, as it wears, provides a first amount of surface roughness which provides asperity tip load support; and
    a second interface area which, as it wears, provides a second amount of surface roughness which provides asperity tip load support, said second amount of surface roughness within said second interface area being different from said first amount of surface roughness within said first interface area.

2. The invention of claim 1 wherein said first and second interface areas are alternating and intersticed.

3. The invention of claim 1 wherein said first and second interface areas are alternating and contiguous.

4. The invention of claim 1 wherein said first interface area and second interface area comprise the same material and the microstructure of one of said interface areas is changed relative to the other interface area.

5. The invention of claim 1 wherein said first interface area and said second interface area comprise different materials.

6. The invention of claim 1 comprising a radial land-dam mechanical face seal.

7. The invention of claim 1 comprising a spiral-groove mechanical face seal.

8. The invention of claim 1 wherein said first and second interface areas are affixed to a substrate.

9. The invention of claim 1 wherein said dynamic seal or bearing interface surface comprises gray iron and the amount of surface roughness of at least one of said interface areas is produced by at least one of the processes selected from the group consisting of leaching, filling, chrome plating and flame spraying.

10. The invention of claim 1 wherein said substrate comprises cast iron, said first interface area comprises hard chrome plate and said second interface area comprises soft chrome plate.

11. The invention of claim 1 wherein said dynamic seal or bearing interface surface comprises carbidic malleable iron and the amount of surface roughness of at least one of said interface areas is produced by laser heat treating.

12. The invention of claim 1 wherein said first interface area comprises high-density alumina and said second interface area comprises low-density alumina.

13. The invention of claim 1 wherein said first interface area comprises high-density silicon nitride and said second interface area comprises low-density silicon nitride.

14. The invention of claim 1 wherein said dynamic seal or bearing interface comprises carbon graphite and the amount of surface roughness of at least one of said interface areas is produced by at least one of the processes selected from the group consisting of siliconizing, density variation, and variable filler.

15. The invention of claim 1 wherein the dynamic seal or bearing interface comprises a polymer and the amount of surface roughness of at least one of said interface areas is produced by at least one of the processes selected from the group consisting of variable filler and radiation.

16. The invention of claim 1 wherein at least one of said interface areas is treated by a roughness producing process to a depth of at least 0.005 inches.

* * * * *

UNITED STATES PATENT AND TRADEMARK OFFICE
CERTIFICATE OF CORRECTION

PATENT NO. : 4,834,400

DATED : May 30, 1989

INVENTOR(S) : Alan O. Lebeck

It is certified that error appears in the above-identified patent and that said Letters Patent is hereby corrected as shown below:

In the Specification:

In column 6, line 18, delete "10 micrometers (0.005 in.)" and insert therefor --0.005 inches--.

Signed and Sealed this

Fifteenth Day of January, 1991

Attest:

HARRY F. MANBECK, JR.

*Attesting Officer*      *Commissioner of Patents and Trademarks*